(12) United States Patent
Zhu et al.

(10) Patent No.: US 10,507,813 B2
(45) Date of Patent: Dec. 17, 2019

(54) METHOD AND SYSTEM FOR AUTOMATED VEHICLE EMERGENCY LIGHT CONTROL OF AN AUTONOMOUS DRIVING VEHICLE

(71) Applicant: Baidu USA LLC, Sunnyvale, CA (US)

(72) Inventors: Fan Zhu, Sunnyvale, CA (US); Qi Kong, Sunnyvale, CA (US); Qi Luo, Sunnyvale, CA (US); Xiang Yu, Sunnyvale, CA (US); Sen Hu, Sunnyvale, CA (US); Guang Yang, San Jose, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 115 days.

(21) Appl. No.: 15/592,101

(22) Filed: May 10, 2017

(65) Prior Publication Data

US 2018/0326956 A1   Nov. 15, 2018

(51) Int. Cl.
| | | |
|---|---|---|
| *B60T 8/58* | (2006.01) | |
| *B60T 7/12* | (2006.01) | |
| *G05D 1/00* | (2006.01) | |
| *B60Q 1/44* | (2006.01) | |
| *B60T 7/22* | (2006.01) | |
| *B60T 8/00* | (2006.01) | |
| *B60T 8/17* | (2006.01) | |
| *B60T 17/22* | (2006.01) | |
| *G01S 17/00* | (2006.01) | |
| *G01S 13/93* | (2006.01) | |

(52) U.S. Cl.
CPC ............... *B60T 8/58* (2013.01); *B60Q 1/444* (2013.01); *B60T 7/22* (2013.01); *B60T 8/00* (2013.01); *B60T 8/17* (2013.01); *B60T 17/22* (2013.01); *G01S 17/00* (2013.01); *B60T 2201/022* (2013.01); *B60T 2210/32* (2013.01); *G01S 13/931* (2013.01); *G01S 2013/9346* (2013.01); *G01S 2013/9367* (2013.01)

(58) Field of Classification Search
CPC ........ B60T 8/58; B60T 7/12; B60T 2201/022; B60Q 1/444; G05D 1/0088
USPC ........................................................ 701/23
See application file for complete search history.

(56) References Cited

U.S. PATENT DOCUMENTS

| | | | |
|---|---|---|---|
| 9,517,767 B1 * | 12/2016 | Kentley | ............... B60N 2/002 |
| 9,804,599 B2 * | 10/2017 | Kentley-Klay | ...... G05D 1/0088 |
| 10,081,357 B2 * | 9/2018 | Saigusa | ............ G08G 1/096791 |

(Continued)

*Primary Examiner* — Tuan C To
(74) *Attorney, Agent, or Firm* — Womble Bond Dickinson (US) LLP

(57) ABSTRACT

In one embodiment, it is determined that an ADV is about to decelerate based on perception of a driving environment surrounding the ADV. In addition, if there is another vehicle that is following the ADV, a distance between the ADV and the following vehicle, as well as the speed of the following vehicle, is determined. A deceleration rate that is required for the following vehicle to avoid a collision with the ADV is determined based on the distance between the ADV and the following vehicle and the speed of the following vehicle. If the deceleration rate is greater than a predetermined threshold, a brake light and an emergency light of the ADV are turned on to warn the following vehicle that the ADV is about to rapidly decelerate as it is treated as an emergency situation.

21 Claims, 8 Drawing Sheets

(56) References Cited

U.S. PATENT DOCUMENTS

| | | | |
|---|---|---|---|
| 2016/0139598 A1* | 5/2016 | Ichikawa | B60W 30/09 |
| | | | 701/25 |
| 2017/0120804 A1* | 5/2017 | Kentley | G05D 1/0088 |
| 2017/0274815 A1* | 9/2017 | Zelman | B60Q 1/44 |
| 2017/0369055 A1* | 12/2017 | Saigusa | G08G 1/096791 |
| 2018/0032078 A1* | 2/2018 | Ferguson | G05D 1/0214 |
| 2018/0057000 A1* | 3/2018 | Lee | B60W 30/16 |
| 2018/0087907 A1* | 3/2018 | DeBitetto | G05D 1/0088 |
| 2018/0259957 A1* | 9/2018 | Charrow | G05D 1/0088 |

* cited by examiner

| Driving Scenario 501 | Threshold(s) 502 | Light Pattern(s) 503 |
|---|---|---|
| ... | ... | ... |

FIG. 5

METHOD AND SYSTEM FOR AUTOMATED VEHICLE EMERGENCY LIGHT CONTROL OF AN AUTONOMOUS DRIVING VEHICLE

TECHNICAL FIELD

Embodiments of the present invention relate generally to operating autonomous vehicles. More particularly, embodiments of the invention relate to signaling a following vehicle in response to an emergency deceleration or stop of an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Keeping a distance between an autonomous driving vehicle (ADV) and another vehicle following the ADV is important when driving the ADV for safety reasons, especially, when the ADV is about to rapidly slow down such as an emergency stop situation. While sudden stop during driving is rare and usually used to avoid accidents, it is very dangerous and may cause other accidents, most likely from the following vehicles.

BRIEF DESCRIPTION OF THE DRAWINGS

Embodiments of the invention are illustrated by way of example and not limitation in the figures of the accompanying drawings in which like references indicate similar elements.

FIG. 5 shows a data structure representing a light pattern mapping table according to one embodiment of the invention.

DETAILED DESCRIPTION

Figure 1:
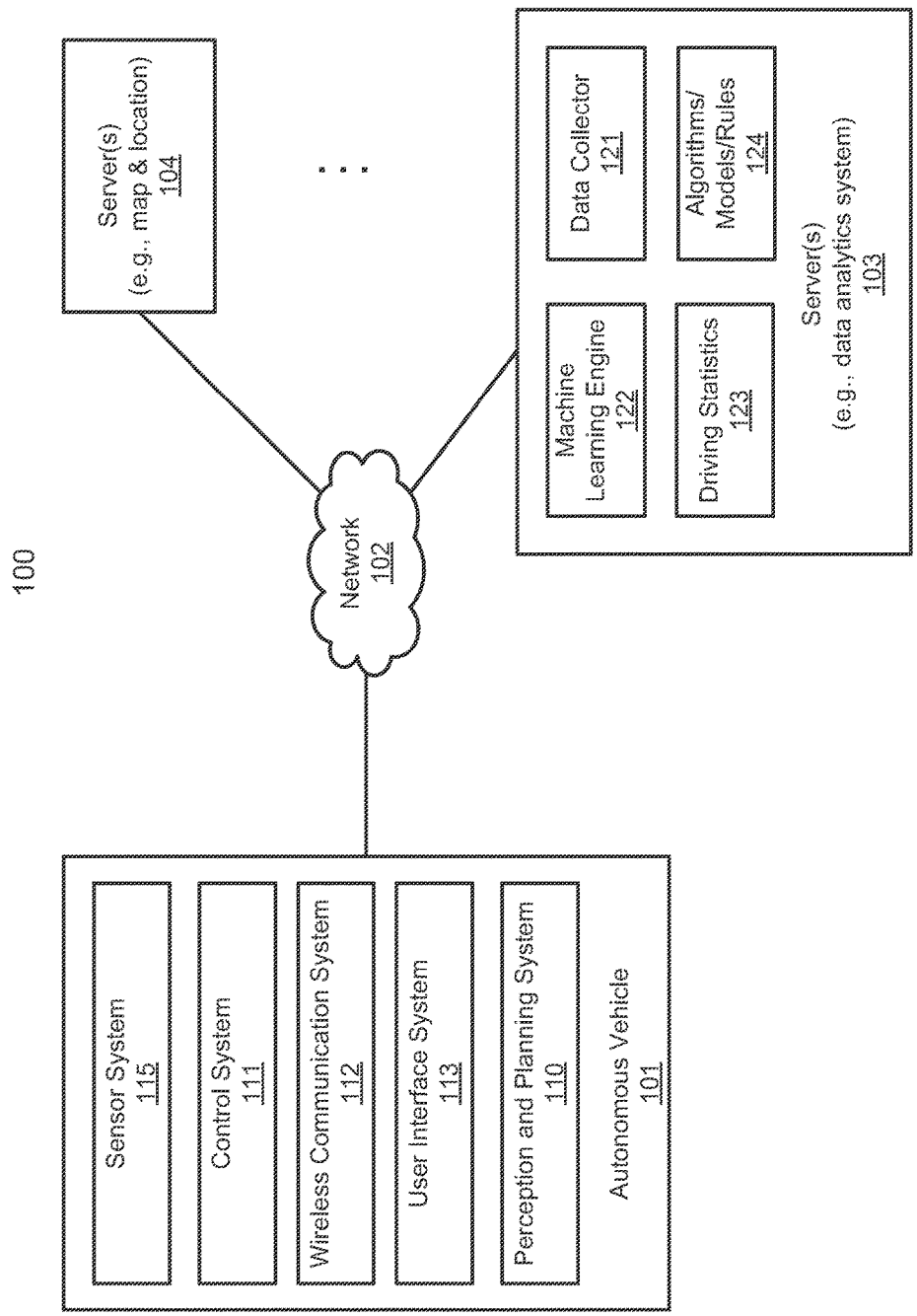
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a brake light and an emergency light of an autonomous driving vehicle (ADV) are utilized to automatically signal a following vehicle that the ADV is about to rapidly decelerate, for example, by turning on both the brake light and the emergency light of the ADV. In generate, when an ADV needs to decelerate, a brake command will be generated and issued to the ADV. As a result, a brake light will be turned on as a pressure is applied to a brake pedal. From a following vehicle point of view, a driver of the following vehicle cannot tell whether the vehicle in front is slowly decelerating or rapidly decelerating based on the brake light. However, if both the brake light and the emergency light are turned on, the driver of the following vehicle more likely recognizes this is an emergency situation and the driver of the following vehicle would likely step on the brake pedal really hard, which may avoid the collision with the vehicle in front.

In one embodiment, it is determined that an ADV is about to decelerate based on perception of a driving environment surrounding the ADV. In addition, if there is another vehicle that is following the ADV, a distance between the ADV and the following vehicle, as well as the speed of the following vehicle, is determined. A deceleration rate that is required for the following vehicle to avoid a collision with the ADV is determined based on the distance between the ADV and the following vehicle and the speed of the following vehicle. If the deceleration rate is greater than a predetermined threshold, a brake light and an emergency light of the ADV are turned on to warn the following vehicle that the ADV is about to rapidly decelerate as it is treated as an emergency situation. If the deceleration rate of the following vehicle is below or equal to the predetermined threshold, only the brake light is turned on as it is treated as a regular or ordinary deceleration. As a result, the following vehicle can perform whatever necessary actions to avoid any potential collision under the circumstances.

According to another embodiment, a deceleration rate of the ADV is determined. If the deceleration rate of the ADV is greater than a predetermined threshold, the driving situation of the ADV and the following vehicle is then analyzed to determine whether an emergency light should be turned on. That is, the emergency light will be turned on only if the ADV is rapidly decelerate in an emergency situation. Otherwise, if the deceleration rate of the ADV is below or equal to the predetermined threshold, the situation will be treated as a regular braking situation and only brake light will be turned on in response to a brake command.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
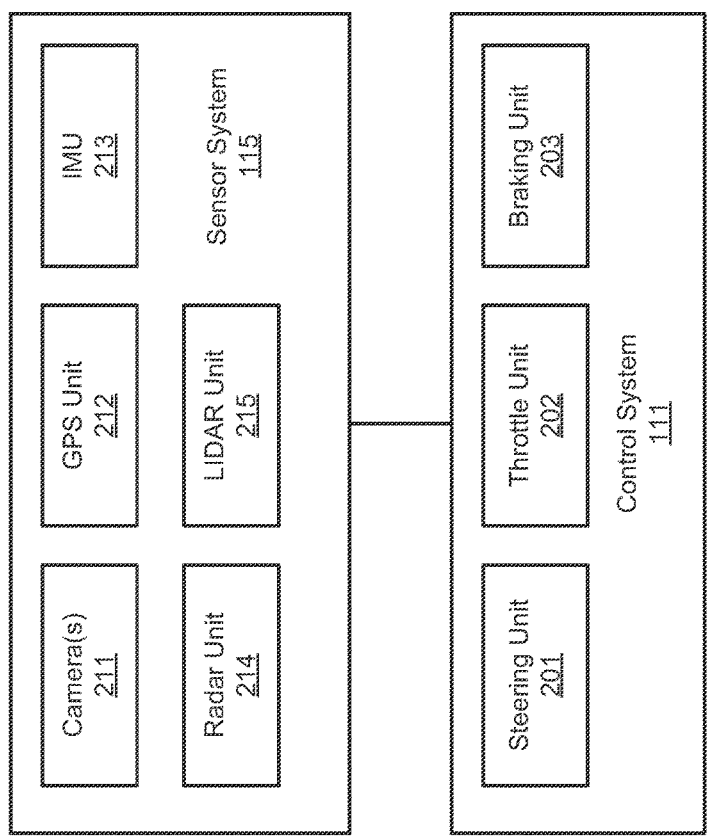
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, heading directions) captured and measured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, rules 124 include a set of rules that are utilized to determine whether an ADV is about to decelerate and how aggressive the deceleration will be. Rules 124 may include a threshold to determine whether the ADV is about to decelerate in an ordinary or regular manner, or the ADV is about to rapidly decelerate in an emergency manner. The threshold may be derived from the driving behaviors of a variety of drivers based on driving statistics 123. For example, if a deceleration rate of an ADV exceeds a threshold, the deceleration may be considered as a rapid deceleration or emergency stop. If the deceleration rate is below or equal to the threshold, the deceleration will be considered as an ordinary deceleration or regular deceleration or stop.

In addition, machine learning engine 122 may determine another deceleration threshold for a vehicle following the ADV as part of rules 124, which may be used to determine whether an emergency light should be turned on when a rapid deceleration of the ADV is about to happen. Such a deceleration threshold may also be derived based on the driving behaviors of a variety of drivers driving a variety of vehicles. For example, if a deceleration that is required for the following vehicle in order to avoid the collision with the ADV in front exceeds the threshold, the following vehicle needs to perform an emergency deceleration or stop. In such a situation, the ADV may turn on both the brake light and the emergency light to signal the following vehicle that the ADV is about to perform an emergency deceleration or emergency stop.

Alternatively, machine learning engine 122 may derive a distance threshold based on the driving statistics 123 used to determine whether the deceleration of the ADV is considered an emergency deceleration from the point of view of the following vehicle. For example, when the ADV is about to decelerate, if the distance between the ADV and the following vehicle is below the distance threshold, both the brake light and the emergency light may be turned on. In one embodiment, if the distance falls below the distance threshold, the brake light and the emergency light may be turned on regardless the deceleration rates or speeds of the ADV and/or the following vehicle. The rationale behind this approach is that if the following vehicle is tailgating too close to the ADV, when the ADV decelerates, the possibility of collision between the ADV and the following vehicle will significantly increase regardless the deceleration rates of the ADV and the following vehicle. These thresholds may be determined in view of the accident statistics in the past.

Furthermore, machine learning engine 122 may determine an average distance between two vehicles under a particular driving environment from driving statistics 123. Machine learning engine 122 determines and generates a set of distance thresholds for different driving scenarios or environments as part of rules 124. In addition, certain brake light and/or emergency light flash patterns may be configured for different driving scenarios. The rules 124 may then be uploaded in a form of a data structure (e.g., table, database) into the autonomous vehicles to be utilized in real time to signal the following vehicles that the ADV is about to rapidly decelerate in an emergency situation. A distance threshold may be determined in view of a safety traffic regulation or a safety distance required for a vehicle to make a full stop in case of an emergency situation.

Figure 3:
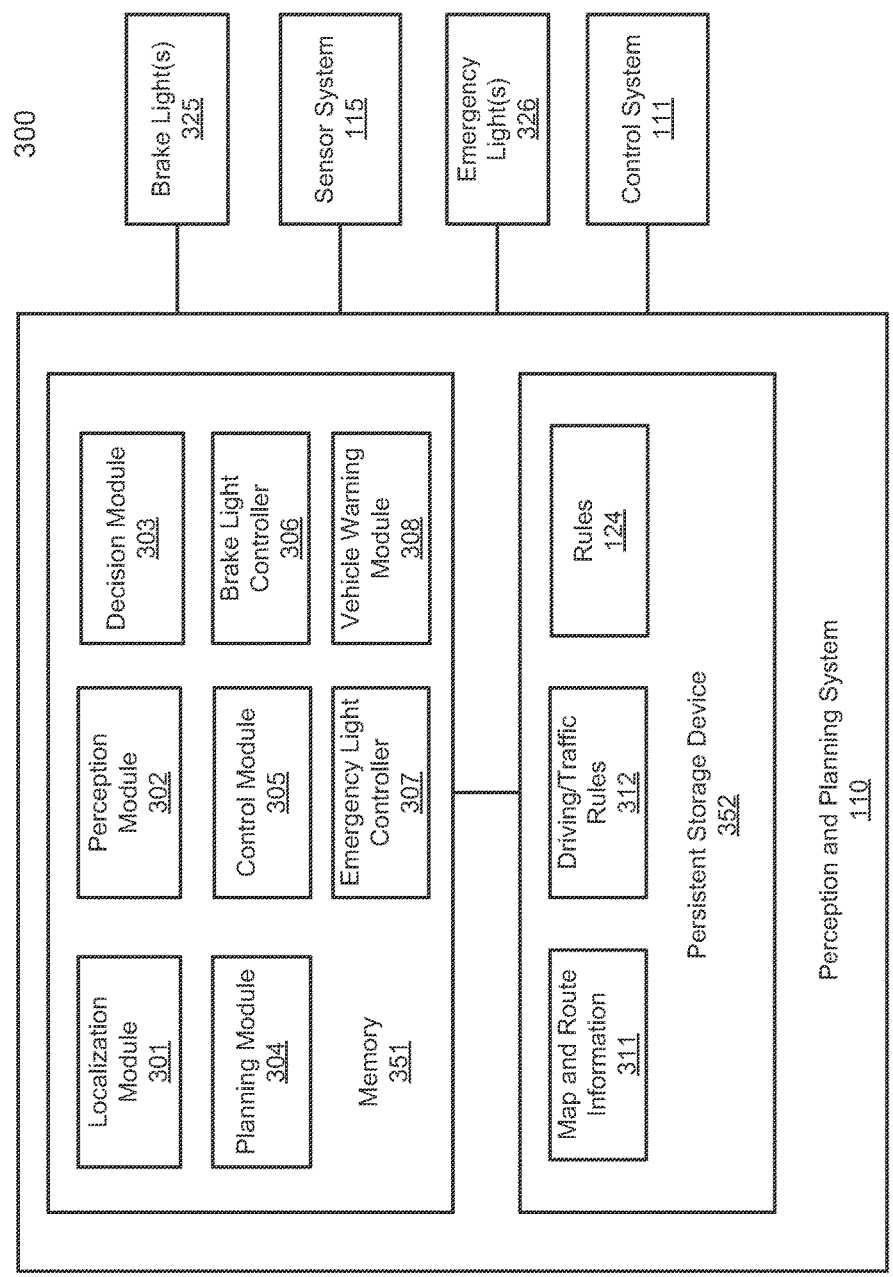
FIG. 3 is a block diagram illustrating an example of a perception and planning system used with an autonomous vehicle according to one embodiment of the invention.
Figure 4:
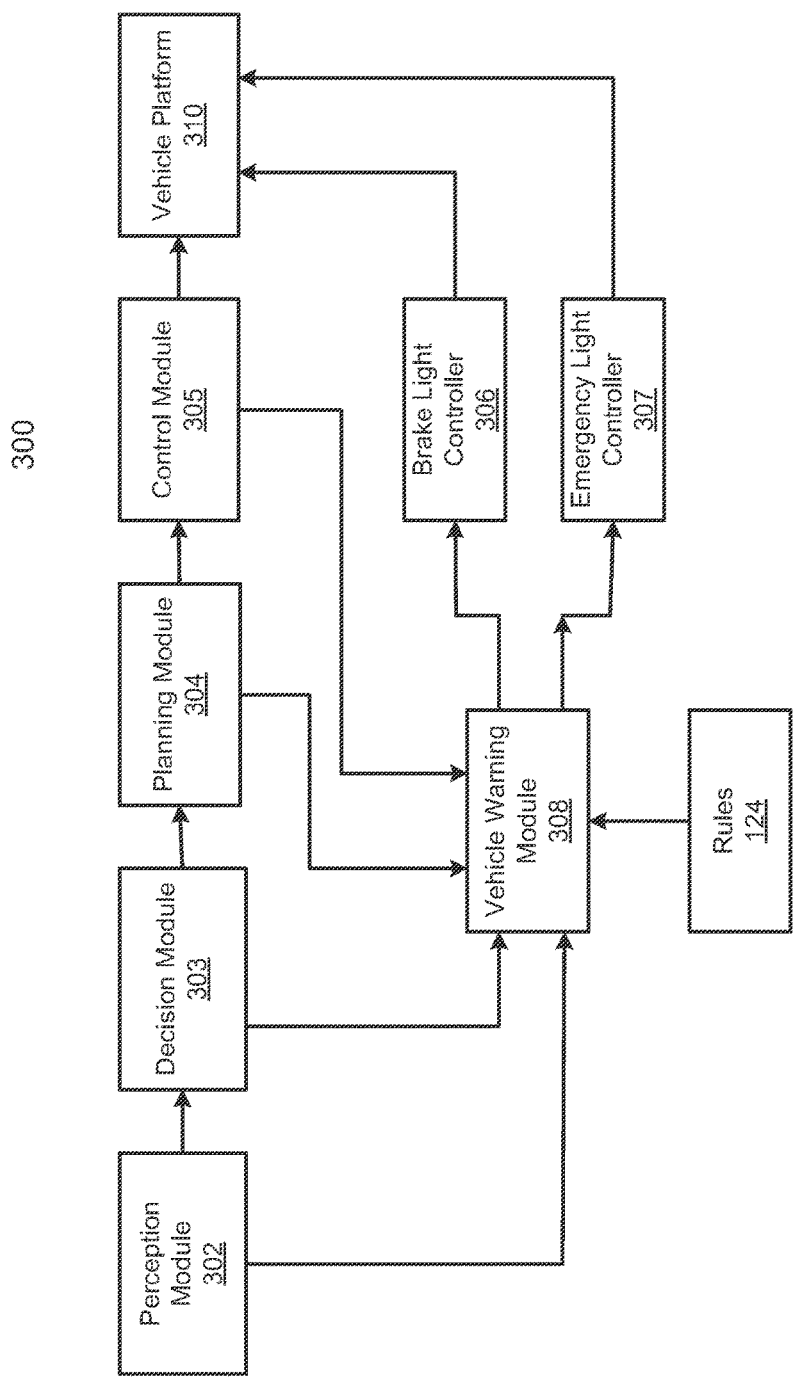
FIG. 4 is a processing flow diagram illustrating an example of a process of operating an autonomous driving vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, control module 305, brake light controller 306, emergency light controller 307, and vehicle warning module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 (also referred to as a map and route module) manages any data related to a trip or route of a user. Localization module 301 determines a current location of autonomous vehicle 300 (e.g., leveraging GPS unit 212) and manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

In one embodiment, vehicle warning module or logic 308 is configured to monitor a driving behavior of a vehicle that follows the autonomous driving vehicle based on the perception information concerning the following vehicle, which may be perceived by perception module 302. Vehicle warning module 308 may be integrated with other components such as decision module 303. When perception module of ADV 300 perceives a following vehicle based on sensor data provided by sensor system 115, decision module 302 is invoked to decide how to handle the following vehicle. In one embodiment, vehicle perception module 302 determines a distance between ADV 300 and the following vehicle.

In one embodiment, when ADV 300 is about to decelerate based on perception of a driving environment surrounding ADV 300, planning module 304 and/or control module 305 determine a deceleration rate that is required for ADV 300 to slow down or make a full stop. For example, based on the distance between the ADV and an object (e.g., another vehicle, a pedestrian, a static obstacle) in front of the ADV, planning module 304 and/or control module 305 determine a deceleration rate based on the distance and the current speed of the ADV (or the relative speed of the ADV with respect to the object) that is required in order to avoid the potential collision with the object.

In one embodiment, the required deceleration rate of the ADV is communicated to vehicle warning module 308. In response, vehicle warning module 308 determines whether the deceleration is a regular deceleration (also referred to as a soft deceleration) or a rapid deceleration (also referred to as a hard deceleration, emergency deceleration or stop). For example, vehicle warning module 308 compares the deceleration rate against a predetermined deceleration threshold. The predetermined deceleration threshold may be obtained from rules 124, which may be determined based on the data analysis on a large amount of driving statistics as described above. In one embodiment, the predetermined deceleration threshold for the ADV is approximately 2 meters per square second (m/s$^2$).

If it is a regular deceleration, in one embodiment, vehicle warning module 308 may do nothing and let planning module 304 and control module 305 perform an ordinary deceleration process, in which case the brake light will be turned on in response to a brake command issued to vehicle platform 310. Alternatively, according to another embodiment, vehicle warning module 308 may instruct brake light controller 306 to turn on one or more brake lights 325 of the ADV prior to issuing a brake command to vehicle platform 310. Turning on a brake light prior to issuing a brake command may provide sufficient warning with additional lead time to any vehicle that may follow or behind the ADV, either on the same lane of the ADV or in an adjacent lane of the ADV, to react.

According to one embodiment, in response to the deceleration rate of the ADV received from planning module 304 and/or control module 305, vehicle warning module 308 determines whether there is any vehicle following the ADV, for example, based on the perception information received from perception module 302 and/or decision or prediction information received from decision module 303. If there is a vehicle following the ADV, vehicle warning module 308 may invoke perception module 302 to determine the distance between the ADV and the following vehicle, as well as the speed of the following vehicle.

If the distance between the ADV and the following vehicle is below a predetermined distance threshold, according to one embodiment, vehicle warning module 308 may instruct brake light controller 306 and emergency light controller 307 to turn on both brake light 325 and emergency light 326 of the ADV at the time of or prior to issuing a brake command. Otherwise if the distance is greater than or equal to the predetermined distance threshold, vehicle warning module 308 may only turn on brake light 325 via brake light controller 306. Alternatively vehicle warning module 308 may do nothing and let planning module 304 and/or control module 305 perform the regular braking process, in which case, brake light 325 will be turned on in response to a brake command. The predetermined distance threshold may be defined as a part of rules 124.

According to another embodiment, based on the distance and the speed of the following vehicle, vehicle warning module 308 may estimate a deceleration rate that is required for the following vehicle in order to avoid a collision with the ADV when the ADV decelerates. The deceleration rate of the following vehicle may be estimated based on a set of rules or a prediction model, which may be a part of rules 124. The deceleration rate of the following vehicle may be estimated based on the distance between the ADV and the following vehicle, the speed of the ADV, the speed of the following vehicle, and/or the deceleration rate of the ADV.

If the deceleration rate of the following vehicle is greater than a predetermined deceleration threshold, vehicle warning module 308 may turn on both brake light 325 and emergency light 326 of the ADV via brake light controller 306 and emergency light controller 307 respectively, at the time of or prior to issuing a brake command. Otherwise if the deceleration rate of the following vehicle is below or equal to the predetermined deceleration threshold, vehicle warning module 308 may only turn on brake light 325 via brake light controller 306. Alternatively vehicle warning module 308 may do nothing and let planning module 304 and/or control module 305 perform the regular braking process, in which case, brake light 325 will be turned on in response to a brake command. The predetermined deceleration threshold may be defined as a part of rules 124. In one embodiment, the predetermined deceleration threshold is approximately 1 $m/s^2$.

According to a further embodiment, based on the distance and the speed of the following vehicle (e.g., in view of the speed and deceleration rate of the ADV), vehicle warning module 308 may estimate the time it takes for the following vehicle to make a full stop in order avoid a collision with the ADV when the ADV decelerates. If the required time is less than a predetermined time threshold, vehicle warning module 308 may turn on both brake light 325 and emergency light 326 of the ADV via brake light controller 306 and emergency light controller 307 respectively, at the time of or prior to issuing a brake command. Otherwise if the required time is greater than or equal to the predetermined time threshold, vehicle warning module 308 may only turn on brake light 325 via brake light controller 306. Alternatively vehicle warning module 308 may do nothing and let planning module 304 and/or control module 305 perform the regular braking process, in which case, brake light 325 will be turned on in response to a brake command. The predetermined time threshold may be defined as a part of rules 124.

In one embodiment, brake light 325 and/or emergency light 326 may be turned on according to a predefined flash pattern. Vehicle warning module 308 looks up in a light pattern mapping table or data structure to determine whether the distance between the ADV and the following vehicle is shorter than a predetermined threshold, whether the required deceleration of the following vehicle is greater than a predetermined threshold, or whether the time required for the following vehicle to make a full stop is below a predetermined threshold. The light pattern mapping table may be configured offline by an analytics system such as machine learning engine 122 of data analytics system 103 based on a large amount of driving statistics. In one embodiment, the light pattern mapping table maps a threshold (e.g., distance, deceleration, or time threshold) to a particular light pattern to control the brake and/or emergency lights, so that the brake/emergency lights emit or flash according to a corresponding light or flash pattern. A light emission or flash pattern may include how long the brake/emergency lights will be turned on, how frequent the brake/emergency lights will be flashed, or a combination thereof (e.g., on and off patterns), etc. An example of brake/emergency light pattern mapping table is shown in FIG. 5.

Referring now to FIG. 5, light pattern mapping table 500 may be configured offline as a part of rules 124 by data analytics system 103 based on the prior driving statistics. In one embodiment, light pattern mapping table 500 includes a number of mapping entries. Each mapping entry maps a driving scenario 501 to a threshold 502 (e.g., distance, deceleration, or time threshold) and light pattern 503. Driving scenario 501 can be one or more of a distance between the ADV and the following vehicle, a speed of the ADV, a speed of the following vehicle, a deceleration rate of the ADV, and a deceleration of the following vehicle. The rationale behind it is that the distance, deceleration rate, or time to make a rapid deceleration or a full stop from different speeds may be different. For the safety reasons, it is better to leave the distance between the leading vehicle and the following vehicle sufficient enough, such that the following vehicle can make a full stop without colliding into the leading vehicle in response to an emergency situation.

Alternatively, driving scenario 501 can be a combination of one or more of a road condition (e.g., rough, smooth road), weather condition (e.g., wet, snowy condition), weight of the vehicle (e.g., number of passengers), speed of the vehicle(s), width of the road, curvature of the road, traffic condition, etc. The weight and speed of the following vehicle may be estimated based on the perception data of the following vehicle. Different driving scenarios may have different thresholds 502. For example, a wet or rough road may require longer distance to make a full stop and thus, threshold 502 may be larger. When the distance between the ADV (e.g., the leading vehicle) and the following vehicle driving under the same or similar driving scenario 501 is detected shorter than the corresponding threshold 502, the brake/emergency light(s) of the ADV may be turned on to signal the following vehicle to slow down.

With light pattern mapping table 500, different thresholds may be maintained for different driving scenarios. In one embodiment, for each of the driving scenarios 501 and threshold(s) 502, light pattern(s) 503 may be specified. That is, under a specific driving scenario (e.g., road condition, speed, weather), if the distance between two vehicles falls below corresponding threshold 502, the brake/emergency lights of the ADV may be turned on according to a light pattern 503 specified in the mapping entry. For example, if the distance between two vehicles falls within a first threshold, the brake/emergency lights of the ADV may be turned on for a first period of time. However, if the following vehicle does not slow down or the distance between two vehicle keeps getting shorter, the brake/emergency lights of the ADV may be turned on for a longer period of time or flash more frequently. Such a pattern typically signals an urgent situation to the driver of the following vehicle.

Figure 6:
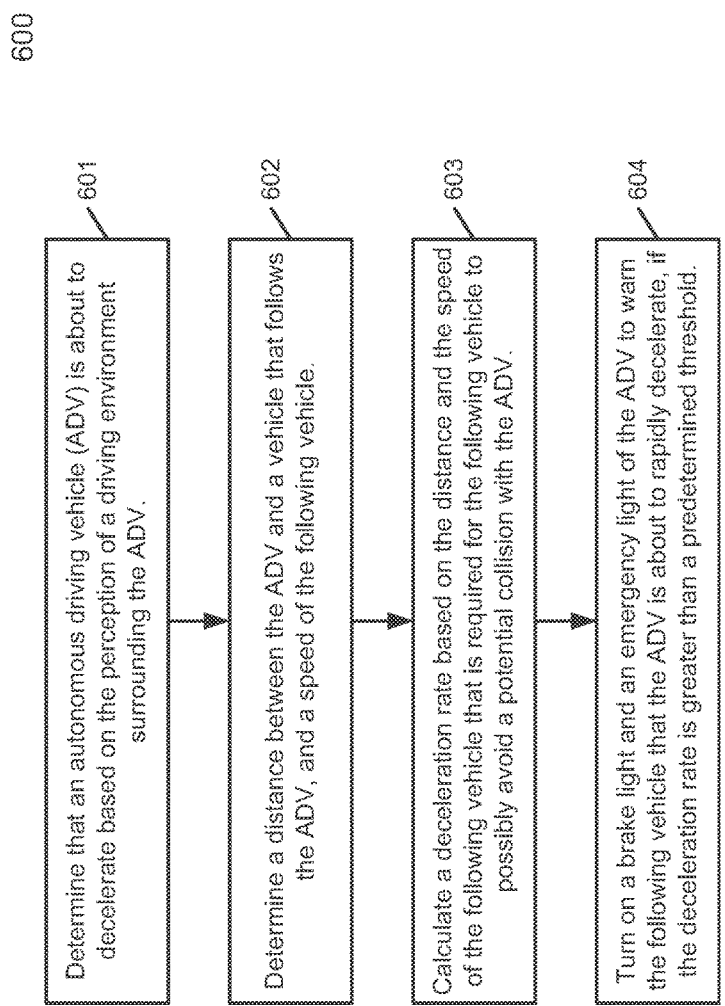
FIG. 6 is a flow diagram illustrating a process of operating an autonomous driving vehicle according to one embodiment of the invention.

FIG. 6 is a flow diagram illustrating a process of operating an autonomous driving vehicle according to one embodiment of the invention. Process 600 may be performed by processing logic which may include software, hardware, or a combination thereof. For example, process 600 may be performed by vehicle warning module 308. Referring to FIG. 6, in operation 601, processing logic determines that an ADV is about to decelerate based on a perception of a driving environment surrounding the ADV. In operation 602, processing logic determines a distance between the ADV and a vehicle that follows the ADV, and a speed of the following vehicle. In operation 603, processing logic calculates a deceleration rate that is required for the following vehicle to avoid a potential collision with the ADV. The deceleration rate of the following vehicle may be estimated based on the distance between the ADV and the following vehicle, the speed of the ADV, the speed of the following vehicle, and/or the deceleration rate of the ADV. In operation 604, processing logic turns on a brake light and an emergency light of the ADV to warn the following vehicle that the ADV is about to rapidly decelerate, if the required deceleration rate is greater than a predetermined threshold.

Figure 7:
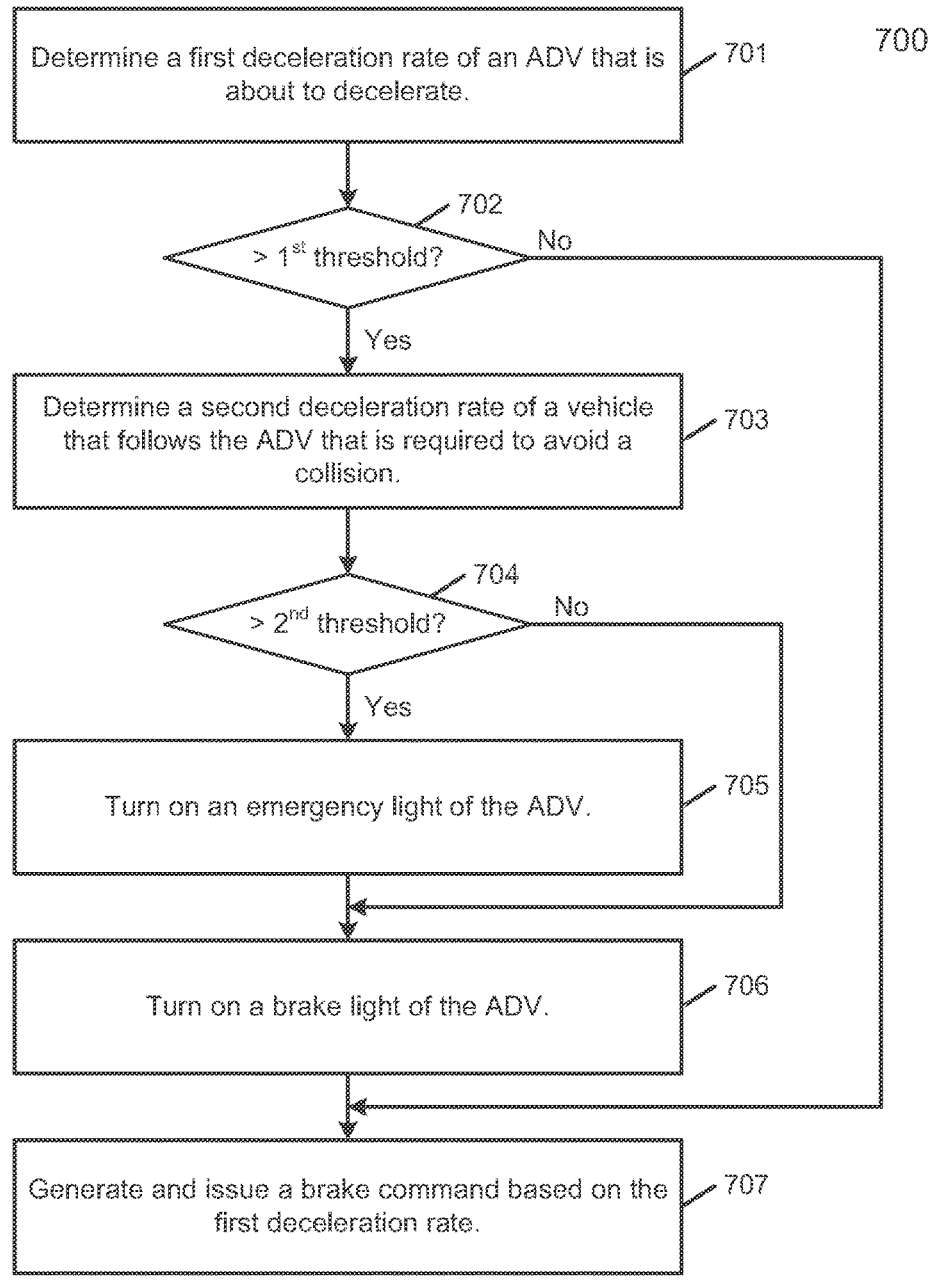
FIG. 7 is a flow diagram illustrating a process of operating an autonomous driving vehicle according to one embodiment of the invention.

FIG. 7 is a flow diagram illustrating a process of operating an autonomous driving vehicle according to another embodiment of the invention. Process 700 may be performed by processing logic which may include software, hardware, or a combination thereof. For example, process 700 may be performed by vehicle warning module 308. Referring to FIG. 7, in operation 701, processing logic determines a first deceleration rate of an ADV to decelerate based on the perception of a driving environment surrounding the ADV. In operation 702, processing logic determines whether the first deceleration rate is greater than a first predetermined threshold. If not, in operation 707, a brake command is generated and issued based on the first deceleration rate, in which a brake light will be turned on in response to the brake command.

If the first deceleration rate is greater than the first predetermined threshold, in operation 703, processing logic determines a second deceleration rate of a vehicle that follows the ADV that is required to decelerate in order to avoid the potential collision with the ADV. The second deceleration rate of the following vehicle may be estimated based on the distance between the ADV and the following vehicle, the speed of the ADV, the speed of the following vehicle, and/or the first deceleration rate of the ADV. In operation 704, processing logic determines whether the second deceleration rate is greater than a second predetermined threshold. If so, in operation 705, processing logic turns on an emergency light of the ADV. In operation 706, processing logic turns on a brake light of the ADV. If second deceleration rate is below or equal than the second predetermined threshold, only the brake light is turned on in operation 706. In operation 707, a brake command is generated and issued to slow down the ADV based on the first deceleration rate. The brake light and/or the emergency light may be turned on in operations 705-706 prior to issuing a brake command in operation 707.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
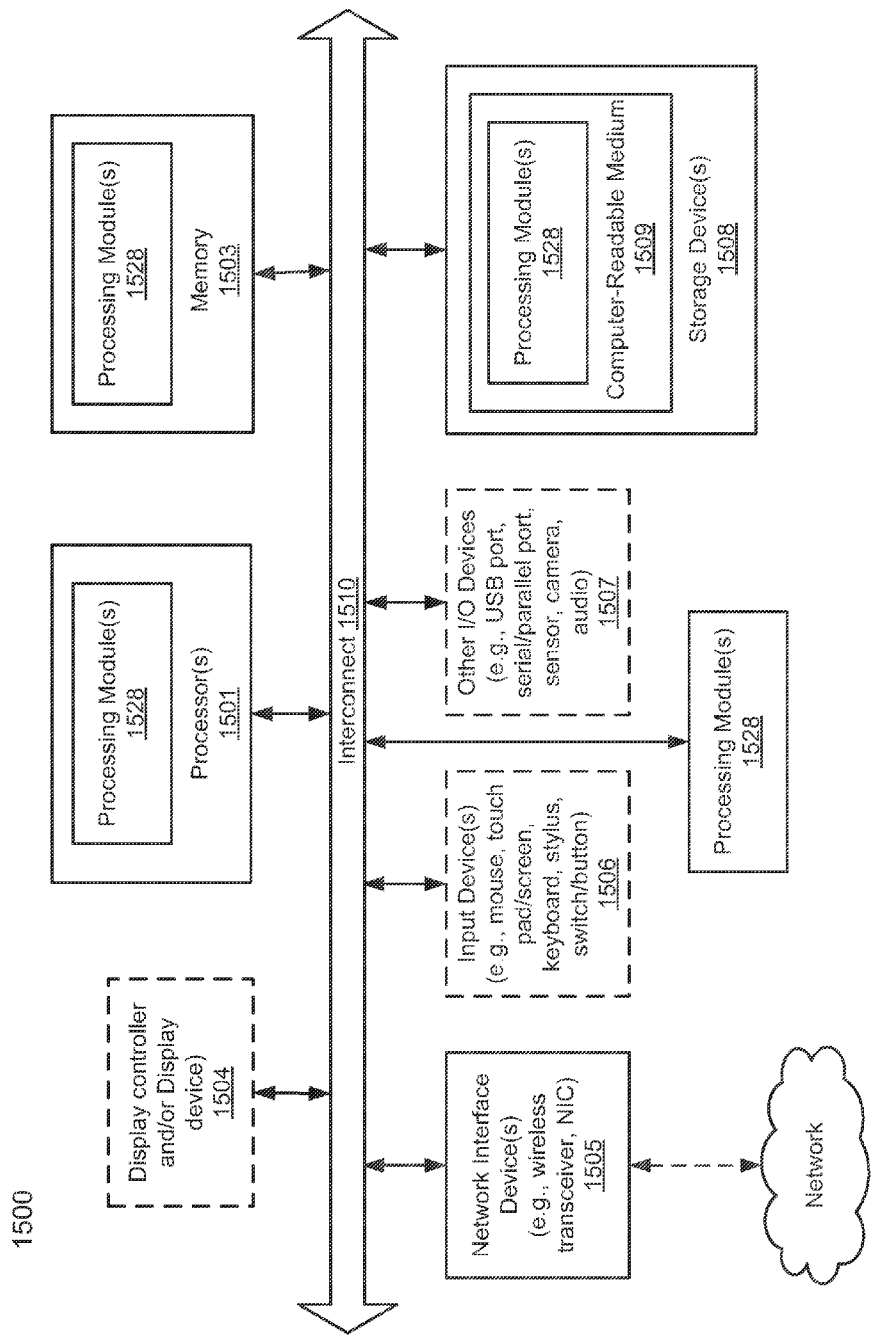
FIG. 8 is a block diagram illustrating a data processing system according to one embodiment.

FIG. 8 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, perception module 302, decision module 303, planning module 304, control module 305, and/or vehicle warning module 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   determining that an autonomous driving vehicle (ADV) is required to decelerate based on perception of a driving environment surrounding the ADV;
   determining a distance between the ADV and a following vehicle that follows the ADV and a speed of the following vehicle;
   estimating a first deceleration rate that is required for the following vehicle to avoid potential collision with the ADV based on the distance and the speed of the following vehicle; and
   turning on a brake light and an emergency light of the ADV to warn the following vehicle that the ADV is about to rapidly decelerate, in response to determining the first deceleration rate is greater than a first predetermined threshold.

2. The method of claim 1, wherein the emergency light comprises a left-turn signaling light and a right-turn signaling light.

3. The method of claim 1, further comprising generating and issuing a brake command to the ADV to decelerate.

4. The method of claim 3, wherein the brake light and the emergency light of the ADV are turned on prior to issuing the brake command to the ADV to decelerate.

5. The method of claim 1, wherein only the brake light is turned on if the first deceleration rate is below or equal to the first predetermined threshold.

6. The method of claim 1, further comprising:
   determining a second deceleration rate associated with the ADV to decelerate; and
   determining whether the second deceleration rate is greater than a second predetermined threshold, wherein the emergency light is turned on only if the second deceleration rate is greater than the second predetermined threshold.

7. The method of claim 6, wherein only the brake light is turned on if the second deceleration rate is below or equal to the second predetermined threshold.

8. A non-transitory machine-readable medium having instructions stored therein, which when executed by a processor, cause the processor to perform operations of operating an autonomous driving vehicle, the operations comprising:
- determining that an autonomous driving vehicle (ADV) is required to decelerate based on perception of a driving environment surrounding the ADV;
- determining a distance between the ADV and a following vehicle that follows the ADV and a speed of the following vehicle;
- estimating a first deceleration rate that is required for the following vehicle to avoid potential collision with the ADV based on the distance and the speed of the following vehicle; and
- turning on a brake light and an emergency light of the ADV to warn the following vehicle that the ADV is about to rapidly decelerate, in response to determining the first deceleration rate is greater than a first predetermined threshold.

9. The machine-readable medium of claim 8, wherein the emergency light comprises a left-turn signaling light and a right-turn signaling light.

10. The machine-readable medium of claim 8, wherein the operations further comprise generating and issuing a brake command to the ADV to decelerate.

11. The machine-readable medium of claim 10, wherein the brake light and the emergency light of the ADV are turned on prior to issuing the brake command to the ADV to decelerate.

12. The machine-readable medium of claim 8, wherein only the brake light is turned on if the first deceleration rate is below or equal to the first predetermined threshold.

13. The machine-readable medium of claim 8, wherein the operations further comprise:
- determining a second deceleration rate associated with the ADV to decelerate; and
- determining whether the second deceleration rate is greater than a second predetermined threshold, wherein the emergency light is turned on only if the second deceleration rate is greater than the second predetermined threshold.

14. The machine-readable medium of claim 13, wherein only the brake light is turned on if the second deceleration rate is below or equal to the second predetermined threshold.

15. A data processing system, comprising:
a processor; and
a memory coupled to the processor to store instructions, which when executed by the processor, cause the processor to perform operations of operating an autonomous driving vehicle, the operations including
- determining that an autonomous driving vehicle (ADV) is required to decelerate based on perception of a driving environment surrounding the ADV,
- determining a distance between the ADV and a following vehicle that follows the ADV and a speed of the following vehicle,
- estimating a first deceleration rate that is required for the following vehicle to avoid potential collision with the ADV based on the distance and the speed of the following vehicle, and
- turning on a brake light and an emergency light of the ADV to warn the following vehicle that the ADV is about to rapidly decelerate, in response to determining the first deceleration rate is greater than a first predetermined threshold.

16. The system of claim 15, wherein the emergency light comprises a left-turn signaling light and a right-turn signaling light.

17. The system of claim 15, wherein the operations further comprise generating and issuing a brake command to the ADV to decelerate.

18. The system of claim 17, wherein the brake light and the emergency light of the ADV are turned on prior to issuing the brake command to the ADV to decelerate.

19. The system of claim 15 wherein only the brake light is turned on if the first deceleration rate is below or equal to the first predetermined threshold.

20. The system of claim 15, wherein the operations further comprise:
- determining a second deceleration rate associated with the ADV to decelerate; and
- determining whether the second deceleration rate is greater than a second predetermined threshold, wherein the emergency light is turned on only if the second deceleration rate is greater than the second predetermined threshold.

21. The system of claim 20, wherein only the brake light is turned on if the second deceleration rate is below or equal to the second predetermined threshold.

* * * * *